United States Patent
Exton et al.

(10) Patent No.: US 11,283,802 B2
(45) Date of Patent: Mar. 22, 2022

(54) AUTONOMOUS APPLICATION PROGRAMMING INTERFACE CLAIM REQUIREMENTS DISCOVERY

(71) Applicant: International Business Machines Corporation, Armonk, NY (US)

(72) Inventors: Scott Anthony Exton, Shailer Park (AU); Leo Michael Farrell, Tamborine Mountain (AU); Keiran Robinson, Southport (AU)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/833,917

(22) Filed: Mar. 30, 2020

(65) Prior Publication Data
US 2021/0306336 A1    Sep. 30, 2021

(51) Int. Cl.
| | | |
|---|---|---|
| *H04L 9/32* | (2006.01) | |
| *H04L 67/02* | (2022.01) | |
| *H04L 67/01* | (2022.01) | |
| *H04L 29/06* | (2006.01) | |

(52) U.S. Cl.
CPC ............ *H04L 63/10* (2013.01); *H04L 9/3242* (2013.01); *H04L 67/02* (2013.01); *H04L 67/42* (2013.01)

(58) Field of Classification Search
CPC ....... H04L 9/3213; H04L 63/10; H04L 63/20; H04L 9/3247; H04L 63/12; H04L 67/02; H04L 63/0815; H04L 63/105; H04L 63/108; H04L 67/42
See application file for complete search history.

(56) References Cited

U.S. PATENT DOCUMENTS

| | | | | |
|---|---|---|---|---|
| 9,942,102 | B2* | 4/2018 | Kirner | ................... H04L 47/12 |
| 9,978,062 | B2* | 5/2018 | Raj | ................ G06Q 20/3821 |
| 10,911,428 | B1* | 2/2021 | Roth | ..................... H04L 63/10 |
| 2007/0226775 | A1* | 9/2007 | Andreasen | .......... H04L 63/0227 726/1 |
| 2008/0148345 | A1* | 6/2008 | Rubio | .................... G06F 21/31 726/1 |
| 2012/0297456 | A1* | 11/2012 | Rose | .................. H04L 63/0876 726/4 |

(Continued)

FOREIGN PATENT DOCUMENTS

CN              109756448 A      5/2019

OTHER PUBLICATIONS

Xu, Rongxu, Wenquan Jin, and Dohyeun Kim. 2019. "Microservice Security Agent Based on API Gateway in Edge Computing" Sensors 19, No. 22: 4905 (Year: 2019).*

(Continued)

*Primary Examiner* — David R Lazaro
(74) *Attorney, Agent, or Firm* — Sonny Z. Zhan (57) ABSTRACT

In an approach for autonomous claim requirements discovery of APIs, a processor receives an access request from a client to a server. A processor validates the access request. A processor queries claim requirements in a claim document from the server upon the validation of the access request. A processor receives the claim requirements. A processor constructs a token based on the claim requirements. A processor sends the token to the server. A processor receives a response from the server. A processor sends the response to the client.

14 Claims, 4 Drawing Sheets

(56) References Cited

U.S. PATENT DOCUMENTS

| | | | | |
|---|---|---|---|---|
| 2015/0039444 | A1* | 2/2015 | Hardin | H04L 41/06 |
| | | | | 705/14.69 |
| 2015/0227749 | A1* | 8/2015 | Schincariol | H04L 41/0806 |
| | | | | 726/28 |
| 2016/0337462 | A1* | 11/2016 | Chen | H04L 67/26 |
| 2018/0075231 | A1* | 3/2018 | Subramanian | G06F 16/86 |
| 2018/0077144 | A1* | 3/2018 | Gangawane | H04L 63/10 |
| 2018/0198686 | A1* | 7/2018 | Kirner | H04L 63/20 |
| 2019/0097996 | A1* | 3/2019 | Gong | H04L 9/32 |
| 2019/0347403 | A1 | 11/2019 | Araya et al. | |
| 2020/0296113 | A1* | 9/2020 | Agarwal | H04L 63/0876 |
| 2020/0396077 | A1* | 12/2020 | Wojcik | G06F 21/6281 |
| 2021/0099297 | A1* | 4/2021 | Mane | H04L 9/0866 |
| 2021/0117514 | A1* | 4/2021 | Kushtagi | H04L 9/3247 |
| 2021/0266306 | A1* | 8/2021 | Furman | H04L 63/08 |

OTHER PUBLICATIONS

Calandra, Mariano, "How to protect APIs with JWT and API Gateway Lambda Authorizer", Oct. 17, 2019, 13 pages, <https://medium.com/swlh/how-to-protect-apis-with-jwt-and-api-gateway-lambda-authorizer-1110ff035df1>.

Ethelbert et al., "A JSON Token-Based Authentication and Access Management Schema for Cloud SaaS Applications", Proceedings of the 5th International Conference on Future Internet of Things and Cloud, Aug. 21-23, 2017, Prague, Czech Republic, 7 pages, <https://ieeexplore.ieee.org/document/8114462>.

Lee, Nick, "Using API Gateways and JWTs for Identity Management in Microservice Based APIs", Sep. 29, 2016, 5 pages, <https://medium.com/@nicklee1/using-api-gateways-and-jwts-for-identity-management-in-microservice-based-apis-9ba275864cef>.

* cited by examiner

AUTONOMOUS APPLICATION PROGRAMMING INTERFACE CLAIM REQUIREMENTS DISCOVERY

BACKGROUND

The present disclosure relates generally to the field of authorization, and more particularly to autonomous claim requirements discovery of application programming interfaces (APIs).

A JSON Web Token (JWT) is a compact claims representation format intended for space constrained environments such as hypertext transfer protocol (HTTP) authorization headers and uniform resource locator (URL) query parameters. JSON stands for JavaScript Object Notation. An API is a set of definitions and protocols for building and integrating application software. JWTs may encode claims to be transmitted as a JSON object that is used as the payload of a JSON Web Signature (JWS) structure or as the plaintext of a JSON Web Encryption (JWE) structure, enabling the claims to be digitally signed or encrypted. JWTs may be represented using a JWS compact serialization or a JWE compact serialization.

SUMMARY

Aspects of an embodiment of the present disclosure disclose an approach for autonomous claim requirements discovery of APIs. A processor receives an access request from a client to a server. A processor validates the access request. A processor queries claim requirements in a claim document from the server upon the validation of the access request. A processor receives the claim requirements. A processor constructs a token based on the claim requirements. A processor sends the token to the server. A processor receives a response from the server. A processor sends the response to the client.

DETAILED DESCRIPTION

The present disclosure is directed to systems and methods for autonomous claim requirements discovery of APIs.

As the API economy continues to grow, the number of APIs maintained by enterprises are increasing dramatically. When an API is accessed, the API may be protected by an API gateway which performs an authorization check of an API client and presents the API client's identity information to the API via a token. Each API may have varied token requirements, based on the function of the API. An API gateway may provide access to multiple APIs which require a down streamed JWT containing claims which are used to identify the API client. Each API may have different requirements about what information is required in the claims found in the presented JWT. An API gateway may need to be statically configured with information about each application and the claims they require. The API gateway may need to build a single JWT containing all attributes and provide that to all APIs. Embodiments of the present disclosure recognize drawbacks to traditional approaches. For example, in maintaining static lists for all applications there is complexity in creating and maintaining a static list. Creating and maintaining the static lists can also become an organizational problem as the application and gateway teams must work in concert. In the second approach, providing applications with more information than necessary (potentially leaking sensitive information) is not a good practice.

Embodiments of the present disclosure describe a mechanism where a down-streamed application can explicitly define the claims the application requires. Embodiments of the present disclosure make the claim information available to an API gateway during the construction of a JWT. Embodiments of the present disclosure ensure that the JWT only contains the necessary information. Embodiments of the present disclosure may not only prevent providing more data than necessary but also simplify the configuration and deployment process as there is no longer a requirement to statically configure the claims for each application.

Embodiments of the present disclosure disclose a mechanism by which an application can communicate JWT requirements to an API gateway. APIs can be queried for claims and identity information which APIs require. The claims and identity information can be embedded within a JWT. The claim requirements may be returned in a well-defined JWT design document. Embodiments of the present disclosure disclose a JWT design document which can be defined as a set of required claims and requirements for an API. An "accept" header may be used by the API to distinguish between a standard API request and a request for the JWT design document. Embodiments of the present disclosure disclose that an API gateway may act as the identity assertion and propagation point for the API. The API gateway may regularly query the API for the claim requirements and may use the claim requirements when generating JWT's claims to pass to the application. The claim requirements can be temporarily cached by the API gateway to help improve performance. The API gateway may also be configured with a whitelist or blacklist of claims which can be used to help limit the claims that are sent to an application.

Figure 1:
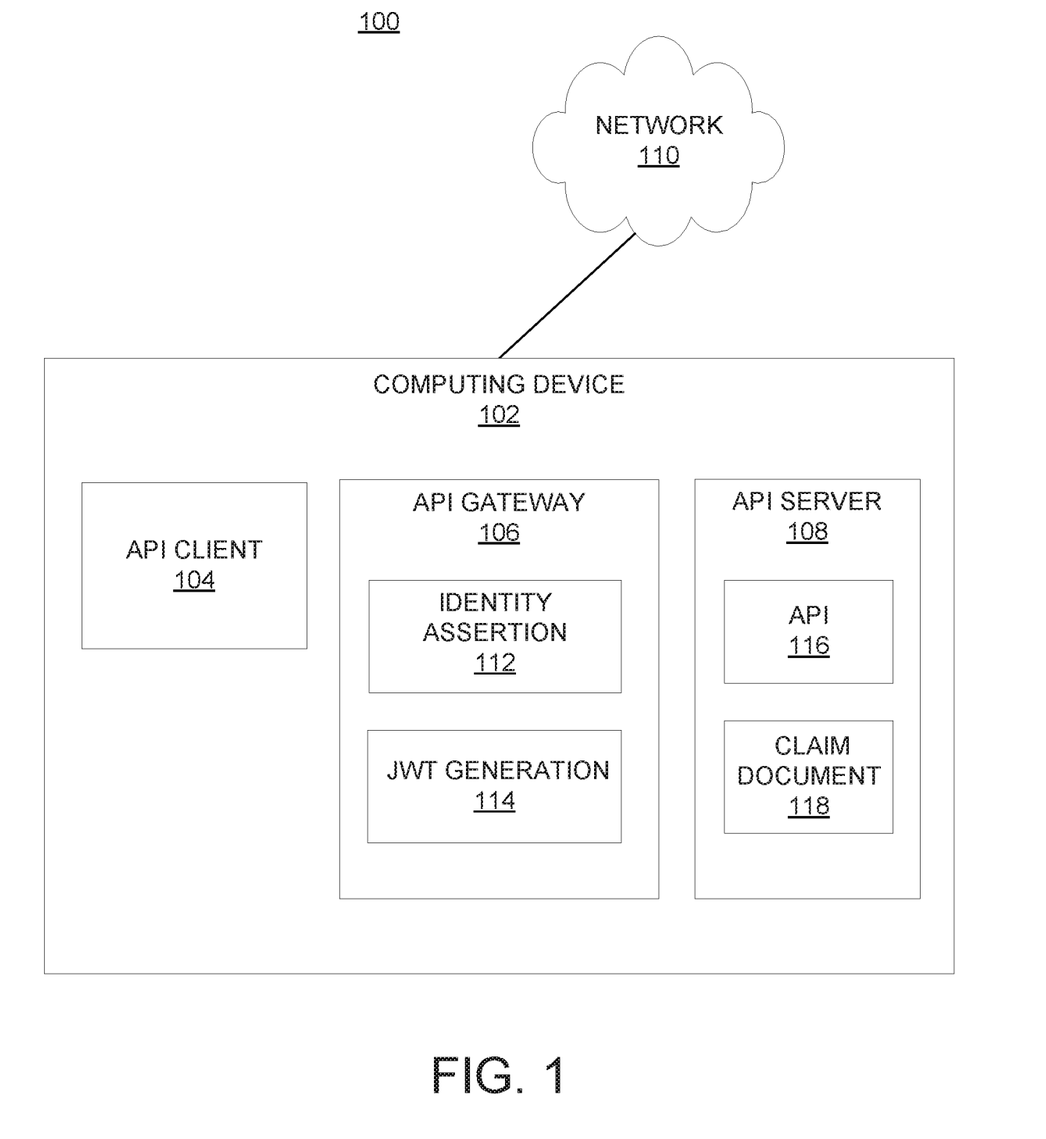
FIG. 1 is a functional block diagram illustrating API access environment, in accordance with an embodiment of the present disclosure.

The present disclosure will now be described in detail with reference to the Figures. FIG. 1 is a functional block diagram illustrating API access environment, generally designated 100, in accordance with an embodiment of the present disclosure.

In the depicted embodiment, API access environment 100 includes computing device 102 and network 110. Computing device 102 includes API client 104, API gateway 106, and API server 108.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to API client 104, API gateway 106, API server 108, and network 110 and is capable of processing program instructions and executing API client 104, API gateway 106, and API server 108, in accordance with an embodiment of the present disclosure. Computing device 102 may include internal and external hardware components, as depicted and described in further detail with respect to FIG. 4.

Further, in the depicted embodiment, computing device 102 includes API client 104, API gateway 106, and API server 108. In the depicted embodiment, API client 104, API gateway 106, and API server 108 are located on computing device 102. However, in other embodiments, API client 104, API gateway 106, and API server 108 may be located externally and accessed through a communication network such as network 110. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and API client 104, API gateway 106, and API server 108, in accordance with a desired embodiment of the disclosure.

In one or more embodiments, API client 104 is a client to request access to use API 116 in API server 108. API 116 may be a set of definitions and protocols for building and integrating application software. In an example, API 118 may be defined to include URL and HTTP methods. API 116 may have various claim requirements based on the function of API 116. Claim requirements may be used to identify API client 104. API client 104 may be an application that operates on computing device 102 to request access to API 116. In the depicted embodiment, API client 104 is a single client to request access to use API 116 in API server 108. However, in other embodiments, API client 104 can be a plurality of clients to request access to use API 116 in API server 108.

In one or more embodiments, API server 108 is a computing service that provides services and manages API 116. In the depicted embodiment, API 116 is one API managed in API server 108. However, in other embodiments, API 116 can be a plurality of APIs managed in API server 108. API server 108 may explicitly define claims in claim document 118 API 106 requires. The claims may be used to identify API client 104. API server 108 may make claim requirements available to API gateway 106 during construction of a token, ensuring that the token only contains the necessary information that API server 108 requires. In the depicted embodiment, API server 108 provides services and manages APIs. However, in other embodiments, API server 108 can provide services and manage any computing programs, applications or other computing services.

In one or more embodiments, API server 108 includes API 116 and claim document 118. In the depicted embodiment, API 116 and claim document 118 are located on API server 108. However, in other embodiments, API 116 and claim document 118 may be located externally and accessed through a communication network such as network 110. The communication network can be, for example, a LAN, a WAN such as the Internet, or a combination of the two, and may include wired, wireless, fiber optic or any other connection known in the art. In general, the communication network can be any combination of connections and protocols that will support communications between API server 108 and API 116 and claim document 118, in accordance with a desired embodiment of the disclosure.

API 116 may be a set of definitions and protocols for building and integrating application software. In an example, API 118 may be defined to include URL and HTTP methods. API 116 may allow two systems to communicate with one another. API 116 may provide the language and contract for how two systems interact. Each API 116 may have documentation and specifications which determine how information can be transferred.

Claim document 118 may be a design document that is defined as a set of claim requirements for API 116. Claim document 118 can be a single defined document to define which claims are required. Claim requirements may be identity information required from API 116 to API client 104. In an example, API gateway 106 may query API claim requirements in claim document 118 from API server 108. API gateway 106 may construct a token based on the queried claim requirements from API server 108.

In one or more embodiments, API gateway 106 may be a computing program that takes API calls from API client 104 and routes API calls to API server 108. API gateway 106 may be located between API client 104 and API server 108. API gateway 106 may act as the identity assertion and propagation point for API server 108. API gateway 106 may act as a reverse proxy, routing requests from API client 104 to API server 108. API gateway 106 may provide functions such as authentication, cache storage, and information exchange between API gateway 106 and API client 104 and API server 108. API gateway 106 may handle tasks involved in accepting and processing API calls from API client 104. In an example, API gateway 106 may act as a single point of entry for API server 108. API gateway 106 may perform an authorization check of API client 104 and may present identity information from API client 104 to API server 108.

In one or more embodiments, API gateway 106 includes identity assertion 112 and JWT generation 114. In the depicted embodiment, identity assertion 112 and JWT generation 114 are located on API gateway 106. However, in other embodiments, identity assertion 112 and JWT generation 114 may be located externally and accessed through a communication network such as network 110. The communication network can be, for example, a LAN, a WAN such as the Internet, or a combination of the two, and may include wired, wireless, fiber optic or any other connection known in the art. In general, the communication network can be any combination of connections and protocols that will support communications between API gateway 106 and identity assertion 112 and JWT generation 114, in accordance with a desired embodiment of the disclosure.

In one or more embodiments, identity assertion 112 is configured to validate an access request from API client 104 to API server 108. API client 104 may send the access request with an access token. The access token can be an API key or other suitable token for the access request to API 116. API client 104 is a client to request access to use API 116 in API server 108. API client 104 may be an application that operates on computing device 102 to request access to API 116. Identity assertion 112 may validate the access request by verifying the access token. Identity assertion 112 may get access and information associated with API client 104. For example, identity assertion 112 get information based on the access token received from API client 104. API gateway 106 may act as the identity assertion and propagation point for API 106 in API server 108.

In one or more embodiments, JWT generation 114 is configured to construct a token based on claim requirements from design document 118 in API server 108. JWT generation 114 may query the claim requirements in claim document 118 from API server 108. JWT generation 114 may receive the claim requirements in claim document 118 from API server 108. Upon receiving the claim requirements from API gateway 106, JWT generation 114 may save the queried claim requirements into a cache to help improve performance. If the claim requirements change, JWT generation 114 may automatically detect the new claim requirements based on the cache interval. JWT generation 114 may update the required claims accordingly, rather than modifying the configuration of API gateway 106 whenever the claim requirements change. JWT generation 114 may construct a token based on claim requirements from design document 118 in API server 108. The newly constructed token can be sent back to API server 108 to verify the claims and process the access request.

The token, for example, can be a JWT. A JWT can define a compact and self-contained way for securely transmitting information between parties (e.g. API gateway 106 and API server 108), as a JSON object. The JWT can be verified and trusted because it is digitally signed. JWTs can be signed using a secret (e.g., with a keyed-hash message authentication code (HMAC) algorithm) or a public/private key pair using Rivest, Shamir, and Adleman (RSA) or elliptic curve digital signature algorithm (ECDSA). JWTs can be used for authorization and information exchange. An example structure of JWT can include a header, a payload, and a signature. The header part may include a type of the token and a signing algorithm being used, such as HMAC secure hash algorithm 256-bit (SHA256) or RSA. An example header can be: {"alg": "HS256", "typ": "JWT"}. The payload part may include claims. The claims are statements about an entity (e.g., a client) and additional data. An example payload could be: {"sub": "1234567890", "name": "John Doe", "admin": true}. The payload can be base64url encoded to form the second part of the JWT. The signature part can be created by taking the encoded header, the encoded payload, a secret of the algorithm specified in the header, and signing that. For example, the signature can be created by using a HMAC SHA256 algorithm. The signature can be created in the following way: HMACSHA256 (base64urlencode(header)+"."+base64urlencode(payload), secret). The output of JWT can have three base64-url strings separated by dots that can be easily passed in HTML and HTTP environments.

A JWT can be a compact claims representation format intended for space constrained environments such as HTTP Authorization headers and URI query parameters. JWTs encode claims to be transmitted as a JSON object that is used as the payload of a JWS structure or as the plaintext of a JWE structure, enabling the claims to be digitally signed or message authentication coded (MACed) and/or encrypted. JWTs may be represented using the JWS compact serialization or the JWE compact serialization. In an example, JWT is a string representing a set of claims as a JSON object that is encoded in a JWS or JWE, enabling the claims to be digitally signed or MACed and/or encrypted. A JWT claims set is a JSON object that contains the claims conveyed by the JWT. A claim is a piece of information asserted about a subject. A claim may be represented as a name/value pair including a claim name and a claim value. A claim name is the name portion of a claim representation. A claim name is a string. A claim value is the value portion of a claim representation. A claim value can be any JSON value. A JWT may include an encoded JSON object signing and encryption (JOSE) header. A JOSE header may describe the cryptographic operations applied to the JWT and optionally, additional properties of the JWT. A JOSE header may include header parameters. The header parameters, for example, can include a content type of the JWT. The content type can be used to convey structural information about the JWT.

A JWT may represent a set of claims as a JSON object that is encoded in a JWS and/or JWE structure. The JSON object is a JWT claims set. The JSON object may include zero or more name/value pairs (or members), where the names are strings and the values are arbitrary JSON values. These members are the claims represented by the JWT. The JSON object may contain white space and/or line breaks before or after any JSON values or structural characters. The member names within the JWT claims set are referred to as claim names. The corresponding values are referred to as claim values. The contents of a JOSE header describe the cryptographic operations applied to a JWT claims set.

A JWT may be represented as a sequence of URL-safe parts separated by period ('.') characters. Each part may contain a base64url encoded value. The number of parts in the JWT is dependent upon the representation of the resulting JWS using the JWS compact serialization or JWE using the JWE compact serialization. JWT claims set represents a JSON object whose members are the claims conveyed by the JWT. The claim names within a JWT claims set may be unique. The set of claims that a JWT contains to be considered valid may be context-dependent. In an example, a JWT may include three parts: a header, a payload, and a signature. The JWT may be is generated by signing the payload with the secret or private key. It is then passed in the authorization header of the request.

In one or more embodiments, API gateway 106 is configured to receive an API request from API client 104. API client 104 may send the access request with an access token. The access token can be an API key or other suitable token for the access request to API 116. API client 104 is a client to request access to use API 116 in API server 108. API client 104 may be an application that operates on computing device 102 to request access to API 116.

In one or more embodiments, API gateway 106 is configured to validate the API request via identity assertion 112. Identity assertion 112 may validate the API request by verifying the access token. Identity assertion 112 may get access and information associated with API client 104. For example, identity assertion 112 get information based on the access token received from API client 104. API gateway 106 may act as the identity assertion and propagation point for API 106 in API server 108.

In one or more embodiments, API gateway 106 is configured to query API claim requirements in claim document 118 from API server 108. In an example, claim document 118 is a design document that is defined as a set of claim requirements for API 116. Claim document 118 can be a single defined document to define which claims are required. Claim requirements may be identity information required from API 116 for API client 104. In an example, API gateway 106 may generate a request to query API claim requirements from API server 108. The request may include a header with an "accept" parameter to distinguish between a standard API request and a request for claim requirements from claim document 118. API gateway 106 may make a request for a JWT manifest file. For example, API gateway 106 may define the "accept" header with for example, 'security/jwt+json' to request a JWT manifest file. API gateway 106 may define schemas for requesting JWT claims. An example structure of a JWT manifest file that is returned from API server 108 for identifying claims can be: {"given_name": {"essential": true}, "nickname": null, "email": {"essential": true}, "email_verified": {"essential": true}, "picture": null, "http://example.info/claims/groups": null}. In an example, API gateway 106 may allow API server 108 to request any claims API server 108 desires. However, in another example, API gateway 106 may have a blacklist to filter out claims. API gateway 106 may also have a whitelist to allow some claims based on the established trust of the applications.

In one or more embodiments, API gateway 106 is configured to receive the claim requirements in claim document 118 from API server 108. API gateway 106 may save the queried claim requirements into a cache to help improve performance. If the claim requirements change, API gateway 106 may automatically detect the new claim requirements based on the cache interval.

In one or more embodiments, API gateway 106 is configured to construct a token based on the claim requirements received from API server 108. The token may be a JWT. API gateway 106 may allow API server 108 to instruct API gateway 106 as to which identity information is required. API gateway 106 may update the required claims accordingly, rather than modifying the configuration of API gateway whenever the claim requirements change. API gateway 106 may construct the JWT by embedding the claim requirements within the JWT based on the claim requirements from API server 108.

For the purpose of illustration, an example structure of the properties of API client 104 may include the following example properties: {"given_name":"Steve", "last_name": "Smith", "email":"user@acme.com", "bank_account_no": "31337", "bank_balance":"$500.00" }. API gateway 106 may query API claim requirements in claim document 118. Claim document 118 may include the following example claim requirements: {"bank_balance": {"essential": true}, "bank_account_no": {"essential": true}}. After API gateway 106 receives the queried claim requirements, API gateway 106 may construct a new JWT including the following claims based on the queried claim requirements. The example claims in the new JWT may include {"bank_account_no":"31337", "bank_balance": "$500.00"}. API gateway 106 may send the newly constructed JWT to API server 108. API server 108 may process the request and send a response based on the newly constructed JWT.

In one or more embodiments, API gateway 106 is configured to send the newly constructed JWT to API server 108. API server 108 processes the API request based on the newly constructed JWT. In one or more embodiments, API gateway 106 is configured to receive a response from API server 108. API gateway 106 determines whether API client 104 is allowed to access API 116 based on the response from API server 108. In one or more embodiments, API gateway 106 is configured to send a response to API client 104 based on the response received from API server 108.

Figure 2:
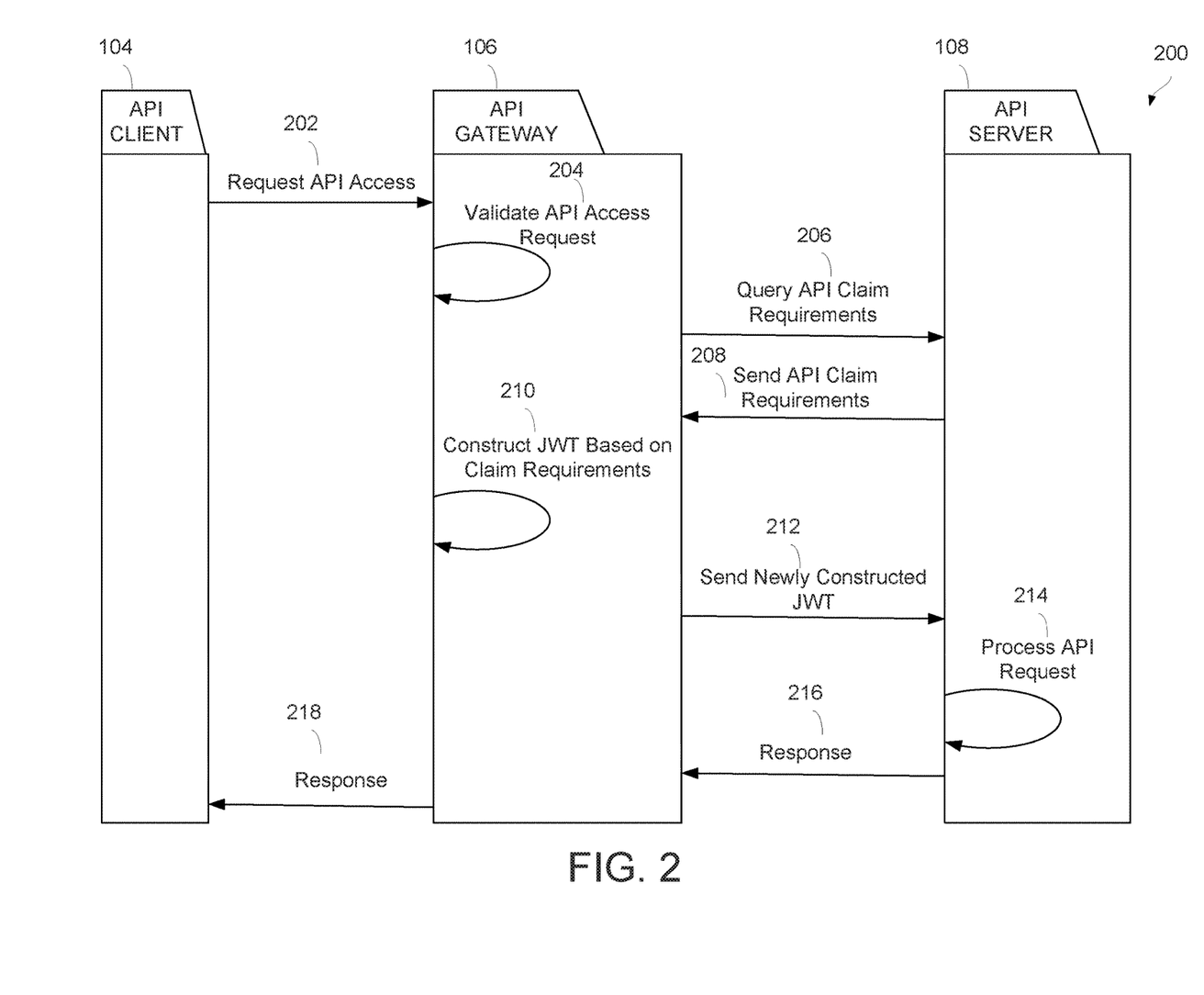
FIG. 2 is a process depicting example interactions of an API client, an API gateway, and an API server within a computing device of FIG. 1, in accordance with an embodiment of the present disclosure.

FIG. 2 is a process 200 depicting example interactions of API client 104, API gateway 106, and API server 108, in accordance with an embodiment of the present disclosure.

In step 202, API client 104 sends an API request to API gateway. API client 104 may send the access request with an access token. The access token can be an API key or other suitable token for the access request to API 116. API client 104 is a client to request access to use API 116 in API server 108. API client 104 may be an application that operates on computing device 102 to request access to API 116.

In step 204, API gateway 106 validates the API request via identity assertion 112. Identity assertion 112 may validate the API request by verifying the access token. Identity assertion 112 may get access and information associated with API client 104. For example, identity assertion 112 get information based on the access token received from API client 104. API gateway 106 may act as the identity assertion and propagation point for API 106 in API server 108.

In step 206, API gateway 106 queries API claim requirements in claim document 118 from API server 108. In an example, claim document 118 is a design document that is defined as a set of claim requirements for API 116. Claim document 118 can be a single defined document to define which claims are required. Claim requirements may be identity information required from API 116 for API client 104. In an example, API gateway 106 may generate a request to query API claim requirements from API server 108. The request may include a header with an "accept" parameter to distinguish between a standard API request and a request for claim requirements from claim document 118. API gateway 106 may make a request for a JWT manifest file. For example, API gateway 106 may define the accept header for example, 'security/jwt+json', to request for a JWT manifest file. API gateway 106 may define schemas for requesting JWT claims. An example structure of a JWT manifest file that is returned from API server 108 for identifying claims can be: {"given_name": {"essential": true}, "nickname": null, "email": {"essential": true}, "email_verified": {"essential": true}, "picture": null, "http://example.info/claims/groups": null}. In an example, API gateway 106 may allow API server 108 to request any claims API server 108 desires. However, in another example, API gateway 106 may have a blacklist to filter out claims. API gateway 106 may also have a whitelist to allow some claims based on the established trust of the applications.

In step 208, API server 108 sends the claim requirements in claim document 118 to API gateway 106 upon the query received from API gateway 106. API gateway 106 may save the queried claim requirements into a cache to help improve performance. When the claim requirements change, API gateway 106 may automatically detect the new claim requirements based on the cache interval.

In step 210, API gateway 106 constructs a token based on the claim requirements received from API server 108. In an example, the token may be a JWT. API gateway 106 may allow API server 108 to instruct API gateway 106 as to which identity information is required. API gateway 106 may update the required claims accordingly, rather than modifying the configuration of API gateway whenever the claim requirements change. API gateway 106 may construct the JWT by embedding the claim requirements within the JWT based on the claim requirements from API server 108. For the purpose of illustration, an example structure of the properties of API client 104 may include the following example properties: {"given_name":"Steve", "last_name": "Smith", "email":"user@acme.com", "bank_account_no": "31337", "bank_balance":"$500.00"}. API gateway 106 may query API claim requirements in claim document 118. Claim document 118 may include the following example claim requirements: {"bank_balance": {"essential": true}, "bank_account_no": {"essential": true}}. After API gateway 106 receives the queried claim requirements, API gateway 106 may construct a new JWT including the following claims based on the queried claim requirements. The example claims in the new JWT may include {"bank_account_no":"31337", "bank_balance": "$500.00"}. API gateway 106 may send the newly constructed JWT to API server 108.

In step 212, API gateway 106 sends the newly constructed JWT to API server 108. In step 214, API server 108 processes the API request using the information found in the newly constructed JWT. In step 216, API server 108 sends a response to API gateway 106 based on the processing result from API server 108. In step 218, API gateway 106 sends a response to API client 104 based on the response received from API server 108.

Figure 3:
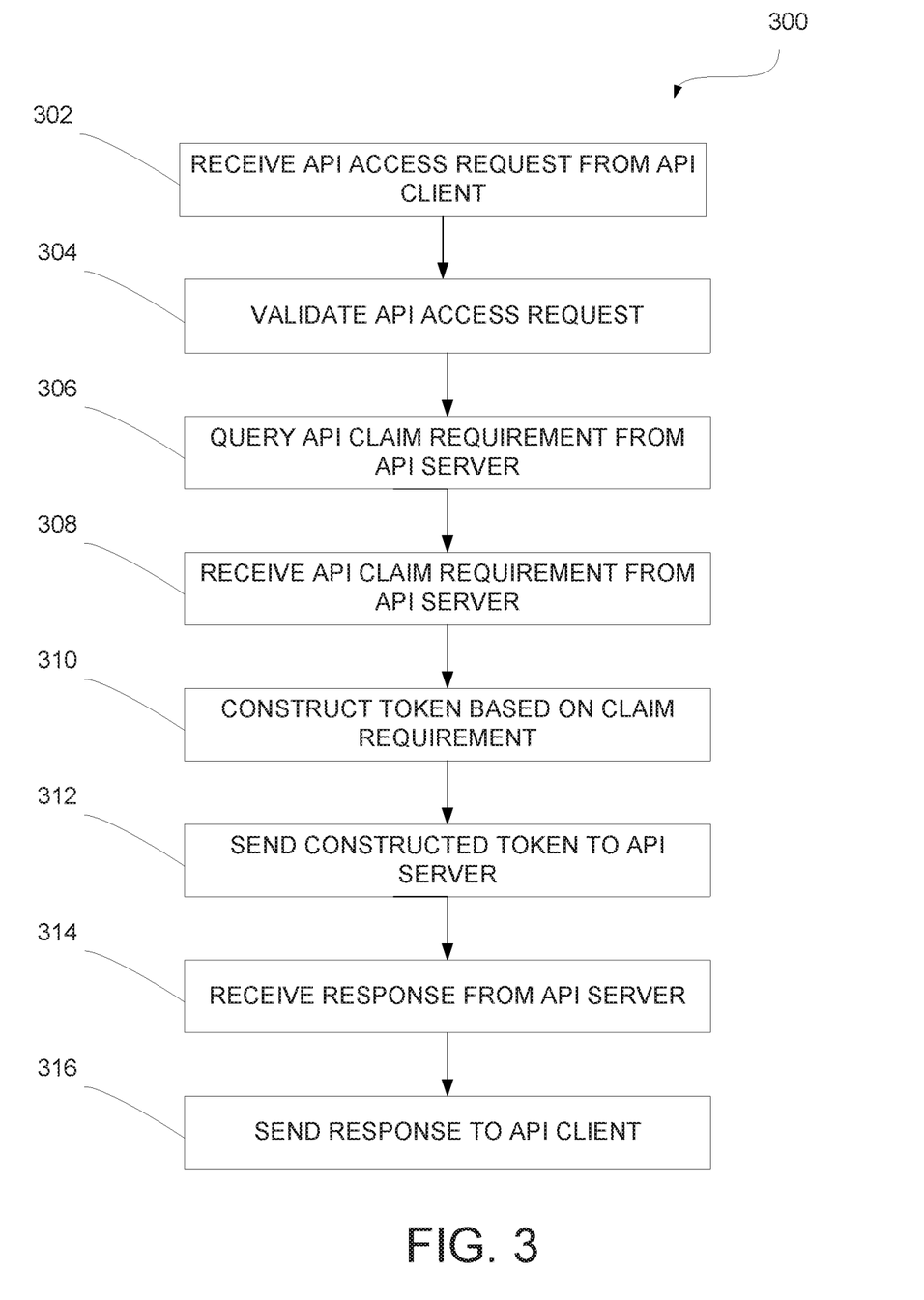
FIG. 3 is a flowchart depicting operational steps of the API gateway included in the computing device of FIG. 1, in accordance with an embodiment of the present disclosure.

FIG. 3 is a flowchart 300 depicting operational steps of API gateway 106 in accordance with an embodiment of the present disclosure.

API gateway 106 operates to receive an API request from API client 104. API gateway 106 also operates to validate the API request via identity assertion 112. API gateway 106 operates to query claim requirements in claim document 118 from API server 108. API gateway 106 operates to receive the claim requirements in claim document 118 from API server 108. API gateway 106 operates to construct a token based on the claim requirements received from API server 108. API gateway 106 operates to send the newly constructed JWT to API server 108. API gateway 106 operates to receive a response from API server 108 based on the processing result from API server 108. API gateway 106 operates to send a response to API client 104 based on the response received from API server 108.

In step 302, API gateway 106 receives an API request from API client 104. API client 104 may send the access request with an access token. The access token can be an API key or other suitable token for the access request to API 116. API client 104 is a client to request access to use API 116 in API server 108. API client 104 may be an application that operates on computing device 102 to request access to API 116.

In step 304, API gateway 106 validates the API request via identity assertion 112. Identity assertion 112 may validate the API request by verifying the access token. Identity assertion 112 may get access and information associated with API client 104. For example, identity assertion 112 get information based on the access token received from API client 104. API gateway 106 may act as the identity assertion and propagation point for API 106 in API server 108.

In step 306, API gateway 106 queries claim requirements in claim document 118 from API server 108. In an example, claim document 118 is a design document that is defined as a set of claim requirements for API 116. Claim document 118 can be a single defined document to define which claims are required. Claim requirements may be identity information required from API 116 for API client 104. In an example, API gateway 106 may generate a request to query API claim requirements from API server 108. The request may include a header with an "accept" parameter to distinguish between a standard API request and a request for claim requirements from claim document 118. API gateway 106 may make a request for a JWT manifest file. For example, API gateway 106 may define the accept header for example, 'security/jwt+json' to request a JWT manifest file. API gateway 106 may define schemas for requesting JWT claims. An example structure of a JWT manifest file that is returned from API server 108 for identifying claims can be: {"given_name": {"essential": true}, "nickname": null, "email": {"essential": true}, "email_verified": {"essential": true}, "picture": null, "http://example.info/claims/groups": null}. In an example, API gateway 106 may allow API server 108 to request any claims API server 108 desires. However, in another example, API gateway 106 may have a blacklist to filter out claims. API gateway 106 may also have a whitelist to allow some claims based on the established trust of the applications.

In step 308, API gateway 106 receives the claim requirements in claim document 118 from API server 108. API gateway 106 may save the queried claim requirements into a cache to help improve performance. If the claim requirements change, API gateway 106 may automatically detect the new claim requirements based on the cache interval.

In step 310, API gateway 106 constructs a token based on the claim requirements received from API server 108. The token may be a JWT. API gateway 106 may allow API server 108 to instruct API gateway 106 as to which identity information is required. API gateway 106 may update the required claims accordingly, rather than modifying the configuration of API gateway whenever the claim requirements change. API gateway 106 may construct the JWT by embedding the claim requirements within the JWT based on the claim requirements from API server 108.

For the purpose of illustration, an example structure of the properties of API client 104 may include the following example properties: {"given_name":"Steve", "last_name": "Smith", "email":"user@acme.com", "bank_account_no": "31337", "bank_balance":"$500.00" }. API gateway 106 may query API claim requirements in claim document 118. Claim document 118 may include the following example claim requirements: {"bank_balance": {"essential": true}, "bank_account_no": {"essential": true}}. After API gateway 106 receives the queried claim requirements, API gateway 106 may construct a new JWT including the following claims based on the queried claim requirements. The example claims in the new JWT may include {"bank_account_no":"31337", "bank_balance": "$500.00"}. API gateway 106 may send the newly constructed JWT to API server 108. API server 108 may process the request and do a response based on the newly constructed JWT.

In step 312, API gateway 106 sends the newly constructed JWT to API server 108. API server 108 processes the API request using the information obtained from the newly constructed JWT.

In step 314, API gateway 106 receives a response from API server 108 based on the processing result from API server 108.

In step 316, API gateway 106 sends a response to API client 104 based on the response received from API server 108.

Figure 4:
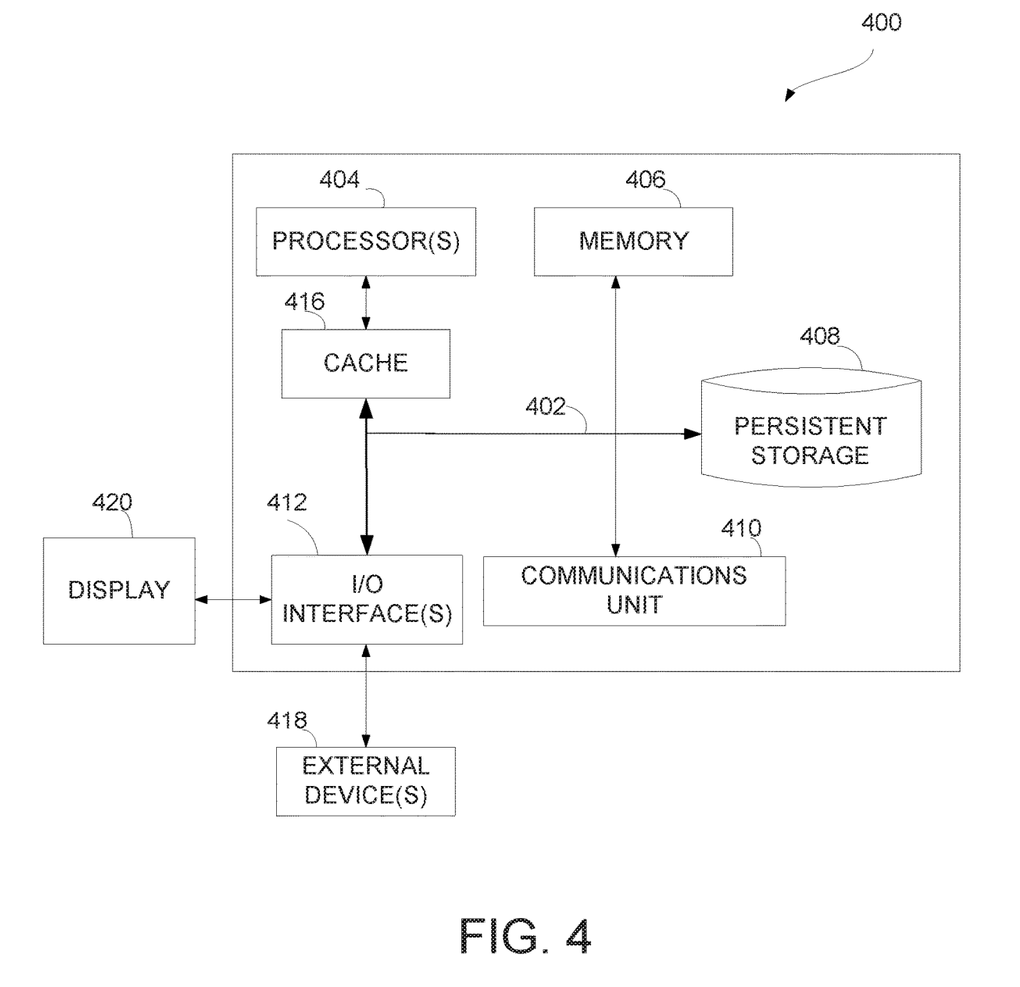
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

API client 104, API gateway 106, and API server 108 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. API client 104, API gateway 106, and API server 108 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., API client 104, API gateway 106, and API server 108 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, by one or more processors, an access request from a client to a server;
validating, by one or more processors, the access request;
querying, by one or more processors, claim requirements in a claim document from the server upon the validation of the access request, wherein the claim requirements include identity information required from an application programming interface to the client;
saving, by one or more processors, the claim requirements in a cache;
automatically detecting, by one or more processors, a change of the claim requirements based on the cache;
updating, by one or more processors, the claim requirements based on the change;
receiving, by one or more processors, the claim requirements;
constructing, by one or more processors, a token based on the claim requirements;
sending, by one or more processors, the token to the server;
receiving, by one or more processors, a response from the server; and
sending, by one or more processors, the response to the client.

2. The computer-implemented method of claim 1, wherein the claim document is a single document defining which claims are required by the server based on the claim requirements.

3. The computer-implemented method of claim 1, wherein the token is a JWT.

4. The computer-implemented method of claim 1, wherein constructing the token includes generating claims based on the claim requirements.

5. The computer-implemented method of claim 1, wherein the server is an API server managing one or more APIs.

6. A computer program product comprising:
one or more computer readable storage media, and program instructions collectively stored on the one or more computer readable storage media, the program instructions comprising:
program instructions to receive an access request from a client to a server;
program instructions to validate the access request;
program instructions to query claim requirements in a claim document from the server upon the validation of the access request, wherein the claim requirements include identity information required from an application programming interface to the client;
saving, by one or more processors, the claim requirements in a cache;
automatically detecting, by one or more processors, a change of the claim requirements based on the cache;
updating, by one or more processors, the claim requirements based on the change;
program instructions to receive the claim requirements;
program instructions to construct a token based on the claim requirements;
program instructions to send the token to the server;

program instructions to receive a response from the server; and program instructions to sending the response to the client.

7. The computer program product of claim 6, wherein the claim document is a single document defining which claims are required by the server based on the claim requirements.

8. The computer program product of claim 6, wherein the token is a JWT.

9. The computer program product of claim 6, wherein program instructions to construct the token include program instructions to generate claims based on the claim requirements.

10. The computer program product of claim 6, wherein the server is an API server managing one or more APIs.

11. A computer system comprising:

one or more computer processors, one or more computer readable storage media, and program instructions stored on the one or more computer readable storage media for execution by at least one of the one or more computer processors, the program instructions comprising:

program instructions to receive an access request from a client to a server;

program instructions to validate the access request;

program instructions to query claim requirements in a claim document from the server upon the validation of the access request, wherein the claim requirements include identity information required from an application programming interface to the client;

saving, by one or more processors, the claim requirements in a cache;

automatically detecting, by one or more processors, a change of the claim requirements based on the cache;

updating, by one or more processors, the claim requirements based on the change;

program instructions to receive the claim requirements;

program instructions to construct a token based on the claim requirements;

program instructions to send the token to the server;

program instructions to receive a response from the server; and program instructions to sending the response to the client.

12. The computer system of claim 11, wherein the claim document is a single document defining which claims are required by the server based on the claim requirements.

13. The computer system of claim 11, wherein the token is a JWT.

14. The computer system of claim 11, wherein program instructions to construct the token include program instructions to generate claims based on the claim requirements.

* * * * *